United States Patent
Chen et al.

(10) Patent No.: US 7,756,991 B2
(45) Date of Patent: Jul. 13, 2010

(54) DATA-PACKET PROCESSING METHOD IN NETWORK SYSTEM

(75) Inventors: Wei-Pin Chen, Taipei (TW); Edward Ku, Taipei (TW); Yun-Fei Chao, Taipei (TW)

(73) Assignee: Via Technologies, Inc., Taipei (TW)

( * ) Notice: Subject to any disclaimer, the term of this patent is extended or adjusted under 35 U.S.C. 154(b) by 216 days.

(21) Appl. No.: 11/952,897

(22) Filed: Dec. 7, 2007

(65) Prior Publication Data

US 2008/0183884 A1 Jul. 31, 2008

(30) Foreign Application Priority Data

Jan. 29, 2007 (TW) .............................. 96103254 A (51) Int. Cl.
*G06F 15/16* (2006.01)
*G06F 15/173* (2006.01)

(52) U.S. Cl. ................. 709/230; 709/237; 709/234; 709/240; 709/226; 709/227; 709/228; 709/229

(58) Field of Classification Search ................ 709/237, 709/234, 240, 226–230; 370/352, 413, 392, 370/395, 229
See application file for complete search history.

(56) References Cited

U.S. PATENT DOCUMENTS 5,867,663 A  2/1999  McClure et al.
2002/0163913 A1 * 11/2002 Oh .............................. 370/392
2003/0223442 A1 * 12/2003 Huang et al. ................ 370/412
2004/0028048 A1 *  2/2004 Jin ............................... 370/392
2004/0179542 A1 *  9/2004 Murakami et al. .......... 370/413
2005/0083917 A1 *  4/2005 Okamoto et al. ........... 370/352
2006/0233102 A1 * 10/2006 Kusumoto .................. 370/229

FOREIGN PATENT DOCUMENTS

CN         1612569 A      5/2005
WO      WO9219060 A1     10/1992
WO         02076029 A1    9/2002
WO         03/103236 A1  12/2003

* cited by examiner

*Primary Examiner*—Wing F Chan
*Assistant Examiner*—Benjamin M Thieu
(74) *Attorney, Agent, or Firm*—Kirton & McConkie; Evan R. Witt (57) ABSTRACT

A data-packet processing method is used in a network system. The network system includes a buffer for optionally storing a data packet to be transferred, and the method includes steps of: determining a type of the data packet to be transferred; determining a storage state of a buffer where the data packet is to be temporarily stored before transferring; and storing the data packet into the buffer if the storage state of the buffer is a packet-accepting storage state; wherein the packet-accepting storage state of the buffer varies with the type of the data packet.

10 Claims, 9 Drawing Sheets

| L2~L7 contents 0 | action 0 |
| L2~L7 contents 1 | action 1 |
| L2~L7 contents 2 | action 2 |
| ......... | ......... |
| L2~L7 contents n | action n |

| L2~L7 contents 0 | buffer portion 0 | action rule 0 |
| --- | --- | --- |
| L2~L7 contents 1 | buffer portion 1 | action rule 1 |
| ... | ... | ... |
| L2~L7 contents n | buffer portion n | action rule n |

DATA-PACKET PROCESSING METHOD IN NETWORK SYSTEM

FIELD OF THE INVENTION

The present invention relates to a data-packet processing method, and more particularly to a data-packet processing method for use in a network system.

BACKGROUND OF THE INVENTION

Figure 1:
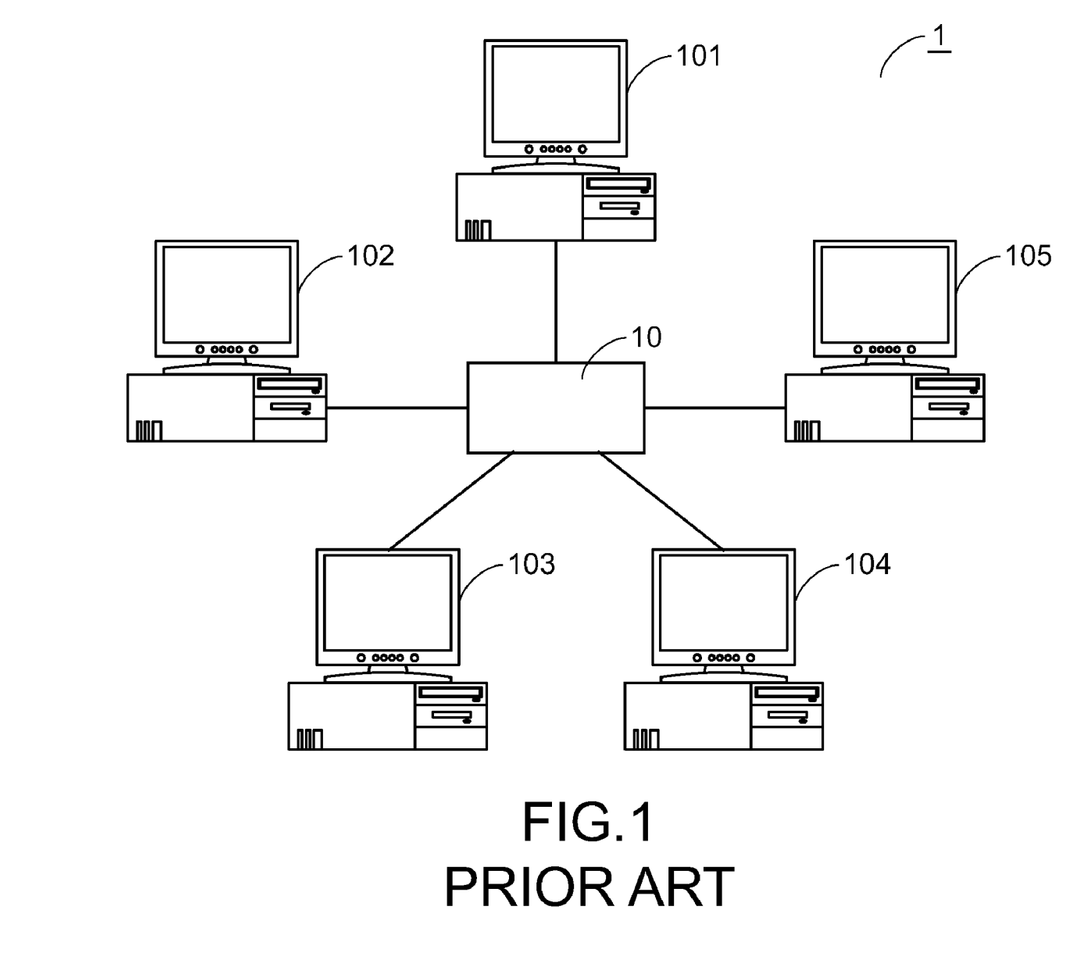
FIG. 1 is a schematic diagram illustrating a local area network system transferring data via a conventional hub.

A network system, e.g. a local area network as shown in FIG. 1, consists of a plurality of stations 101~105 and a hub 10 connected to the stations 101~105. The stations 101~105 can be personal computers or computer servers, which transfer/receive data packets to/from one another via the hub 10. As a hub is substantially a Level 1 device, it merely functions for connection of stations other than management of data packets. In other words, the stations may arbitrarily transfer data via the hub by sharing the bandwidth. The more the stations work through the hub, the slower the operational speed of the network system due to the limitation of bandwidth.

Switch hubs which are Level 2 devices are thus developed for transferring and managing data packets among stations in order to maintain the operational speed of the network system at a satisfactory level. A switch hub not only allows data packets to be transferred thereby but also functions for screening data packets and allocating the data packets.

Figure 2A:
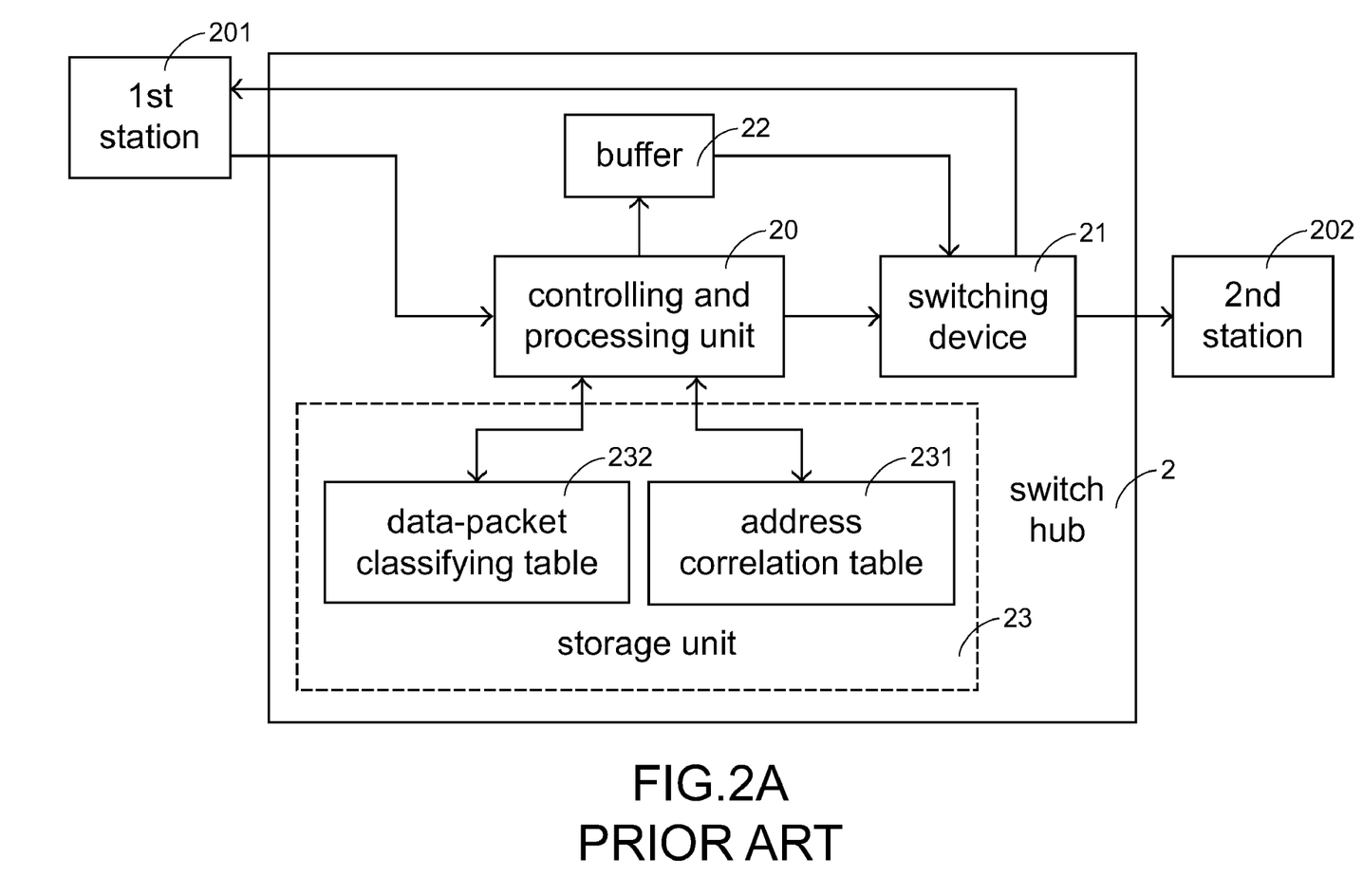
FIG. 2A is a block diagram schematically showing a switch hub for transferring data in a network system according to prior art.
Figure 2B:
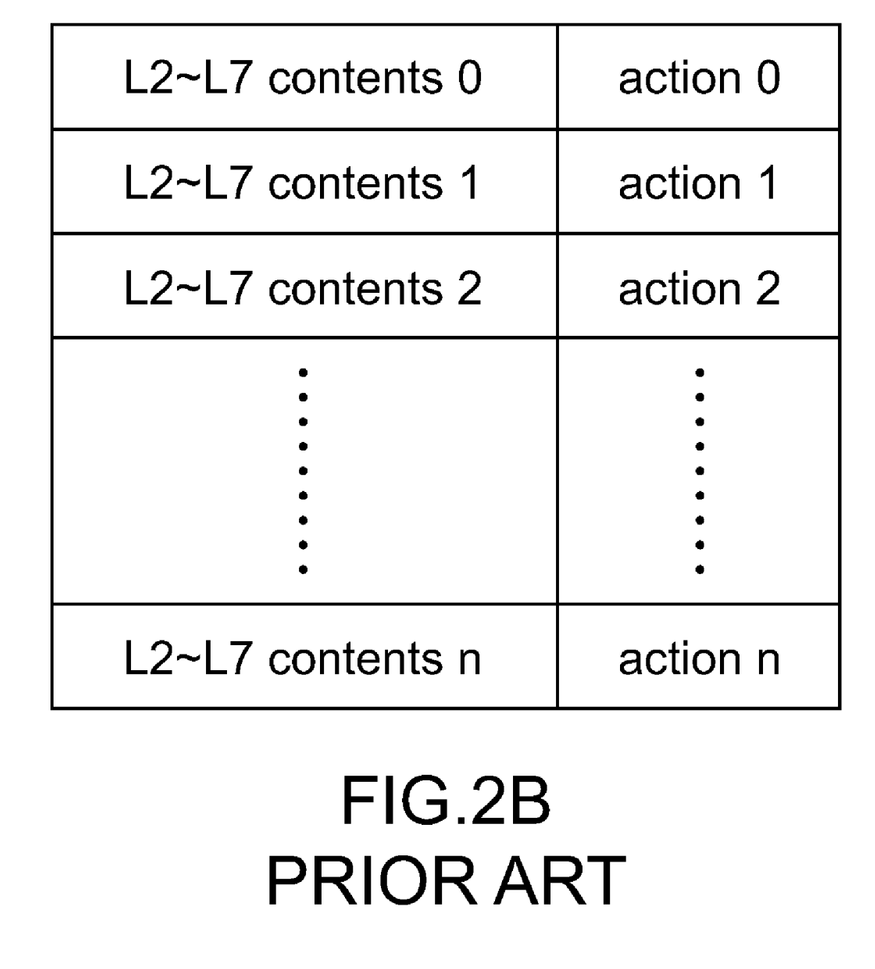
FIG. 2B is a schematic data-packet classifying table used in the switch hub of FIG. 2A.

A switch hub and its operational principle are illustrated in FIG. 2A and FIG. 2B. For example, the switch hub 2 is connected thereto a first station 201 and a second station 202. The switch hub 2 includes a controlling and processing unit 20, a switch device 21, a buffer 22 and a storage unit 23. When the first station 201 is to transfer a data packet to the second station 202 via the switch hub 2, the controlling and processing unit 20 checks the contents from Level 2 to Level 7 (L2~L7 contents) of the data packet to classify the data packet. If there is space available in the buffer 22 to receive the coming data packet, the data packet will be stored into the buffer 22 after being classified according to its L2~L7 contents and wait to be transmitted to a destination station, e.g. the station 202. The destination station is determined according to a destination address recorded in the transmitted data packet and an address correlation table 231 stored in the storage unit 23. On the other hand, when the buffer 22 has no further space for the coming data packet, the controlling and processing unit 20 corresponds the L2~L7 contents to a specified action according to a classifying table, which is briefly depicted in FIG. 2B. For example, when the L2~L7 contents 0 indicates that the data packet is a transmission control protocol (TCP) packet, the action 0 can be a retransmit action when the buffer 22 has no further space for the coming data packet. That is, the TCP data packet is requested to issue a retransmit signal to the station 201 via the controlling and processing unit 20 and the switch device 21 in order to have the data packet successfully transmitted. In another example, when the L2~L7 contents 1 indicates that the data packet is a user datagram protocol (UDP) packet, the action 1 can be a discard (not retransmit) action when the buffer 22 has no further space for the coming data packet.

An example of the UDP data is video/audio data transmitted for a video conference in a local area network. The transmission of such data is required to be real time and the data is not allowed to be retransmitted. If the video conference is being held while the there are a number of data packets being transmitted in the network, the buffer 22 is likely to become full soon, particularly when there are many data being transmitted and repetitively retransmitted. In the mean time, the UDP data that are supposed not to be retransmitted may be discarded to an unacceptable degree, resulting in intermittent images and voices.

SUMMARY OF THE INVENTION

Therefore, the present invention provides a data-packet processing method which manages the receipt of data packets in the buffer in a more practical manner.

A data-packet processing method for transferring a data packet in a network system according to the present invention includes steps of: determining a type of the data packet to be transferred; determining a storage state of a buffer where the data packet is to be temporarily stored before transferring; and storing the data packet into the buffer if the storage state of the buffer is a packet-accepting storage state; wherein the packet-accepting storage state of the buffer varies with the type of the data packet.

In a data-packet processing method used in a network system according to the present invention, the network system includes a buffer for optionally storing a data packet to be transferred, and the method includes steps of: detecting a remaining space of the buffer; prohibiting a first type of data packet and a second type of data packet from being stored into the buffer when the remaining space of the buffer is not greater than a first threshold; allowing the first type of data packet and the second type of data packet to be stored into the buffer when the remaining space of the buffer is greater than a second threshold; and allowing the first type of data packet to be stored into the buffer while prohibiting the second type of data packet from being stored into the buffer when the remaining space of the buffer is greater than the first threshold but not greater than the second threshold.

A network system for transferring a data packet from a first station according to the present invention includes: a buffer coupled to the first station for receiving and temporarily storing the data packet when a storage state of the buffer is a packet-accepting storage state; a controller coupled to the first station and the buffer for determining a type of the data packet and a storage state of the buffer, and prohibiting the data packet from being stored into the buffer when the storage state of the buffer is not the packet-accepting storage state; and a switching device coupled to the buffer, the controller and a plurality of stations for transferring the data packet stored in the buffer to one of the stations.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 3A:
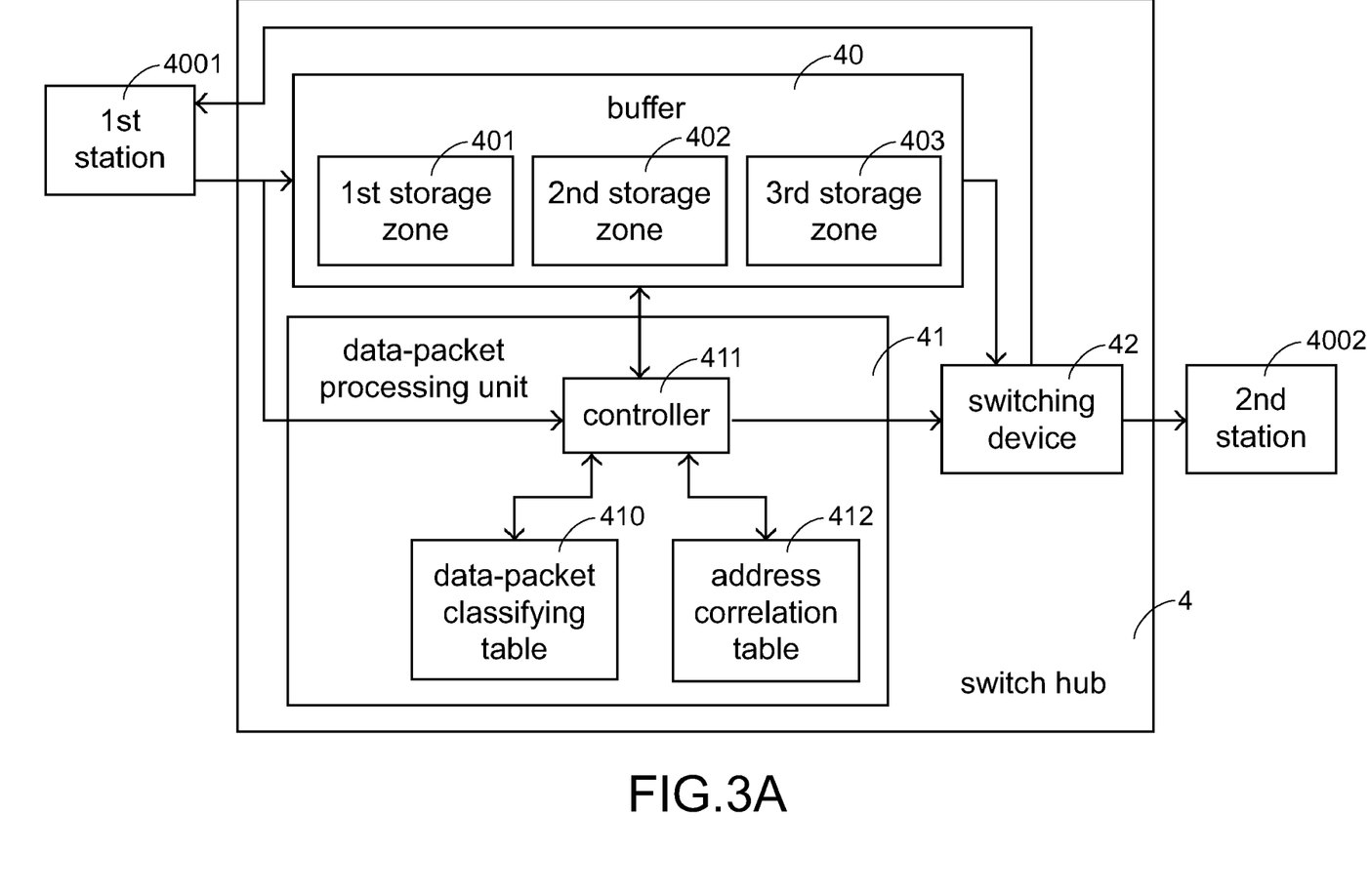
FIG. 3A is a block diagram schematically showing a switch hub for transferring data in a network system according to an embodiment of the present invention.

Please refer to FIG. 3A, which illustrates a network system for processing data packets according to an embodiment of the present invention. In the network system, a plurality of stations, e.g. a first station 4001 and a second station 4002, are coupled to a switch hub 4 and transfer data to one another via the switch hub 4. The switch hub 4 includes a buffer 40, a data-packet processing unit 41 and a switching device 42. The buffer 40 includes a plurality of storage zones, e.g. a first storage zone 401, a second storage zone 402 and a third storage zone 403, and is used for temporarily storing a data packet which is transmitted from one of the stations, the first station 4001, and waiting to be transferred to another station, e.g. the second station 4002, through the switching device 42 by the data-packet processing unit 41. The plurality of storage zones 401, 402 and 403 are used for storing different types of data packets. For example, the first storage zone 401 is used for storing a first type of data packet, e.g. a UDP packet, the second storage zone 402 is used for storing a second type of data packet, e.g. a TCP packet, and the third storage zone 403 is used as a global zone for both types of data packets. When a data packet is transmitted from the first station 4001 to the switch hub 4, a controller 411 of the data-packet proceeding unit 41 determines the type of the data packet by referring to Layer 2 to Layer 7 (L2~L7) contents of the data packet. Meanwhile, the controller 411 checks the states of the storage zones corresponding to the data packet. According to the type of the data packet, the states of the storage zones and a data-packet classifying table 410, a proper action can be taken to process the data packet.

Figure 3B:
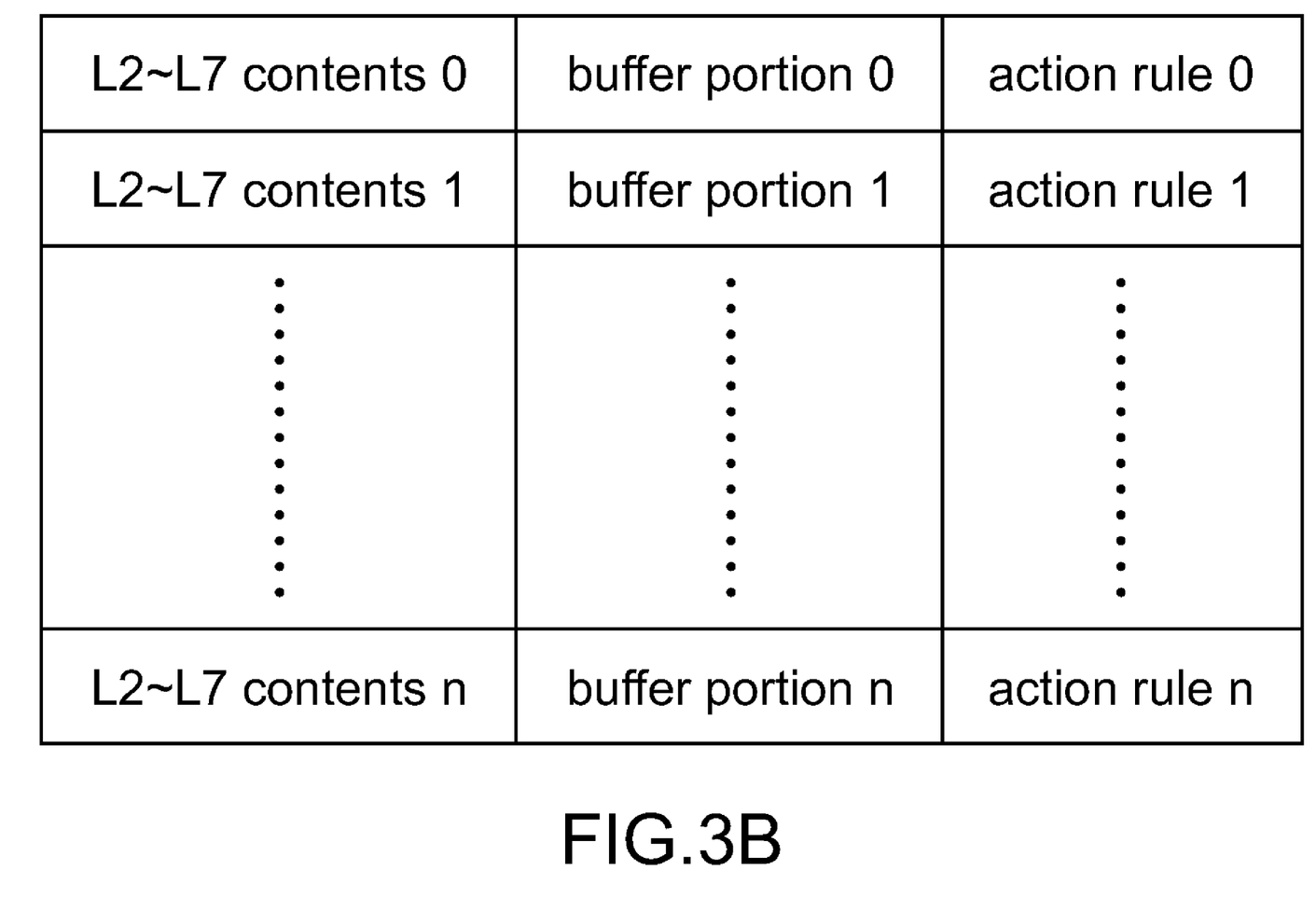
FIG. 3B is a schematic data-packet classifying table used in the switch hub of FIG. 3A.
Figure 4:
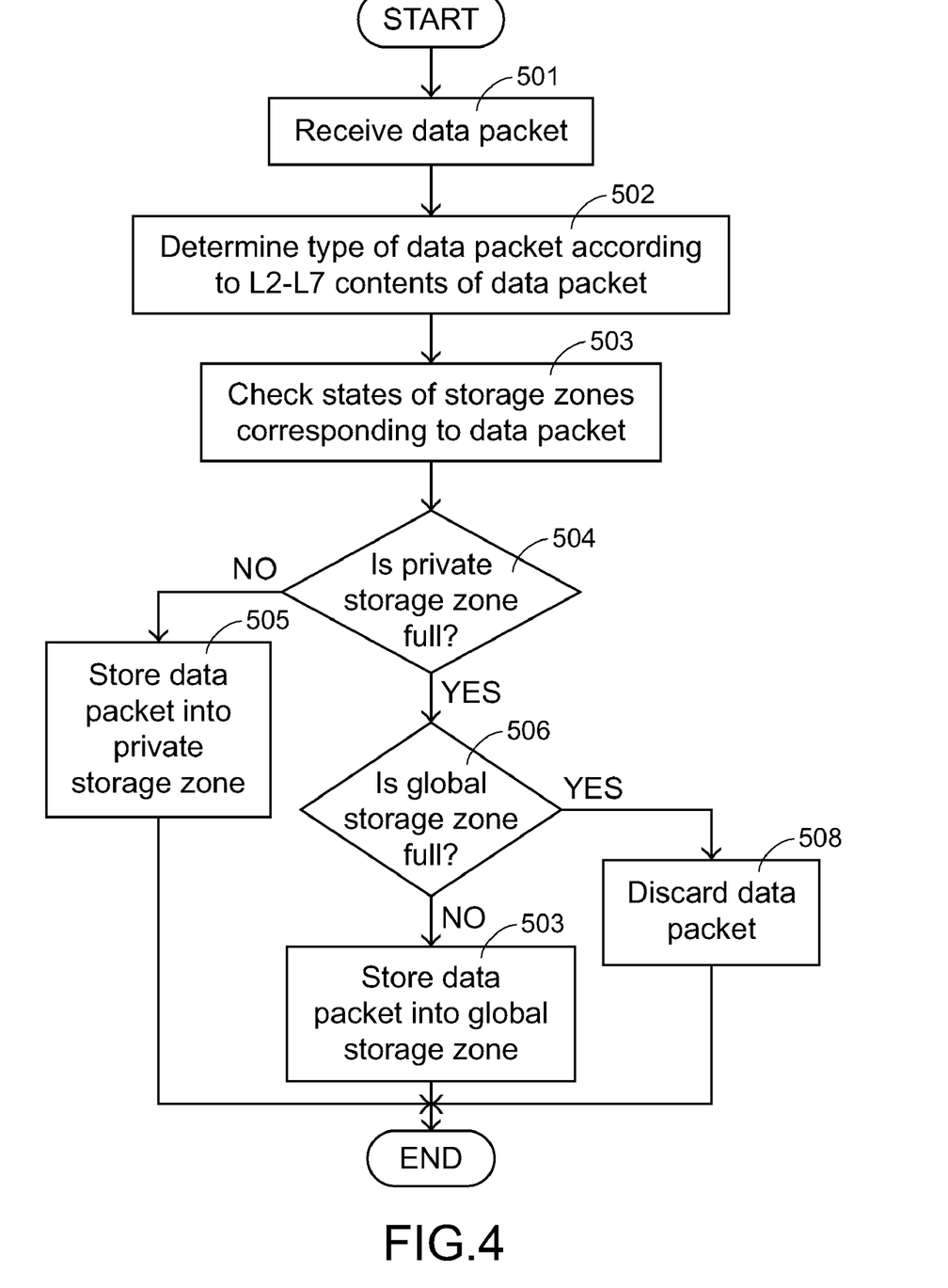
FIG. 4 is a flowchart illustrating a data-packet processing method according to a first embodiment of the present invention.

Please refer to FIG. 3B, in which a data-packet classifying table is exemplified. As shown, each type of data packet is associated with a specific buffer portion involving one or more storage zones. That is, the data packet having L2~L7 contents 0 corresponds to the buffer portion 0, the data packet having L2~L7 contents 1 corresponds to the buffer portion 1, and so on. In a case that the input data packet has L2~L7 contents 0, the controller 411 detects the state of the corresponding buffer portion 0, and executes the action rule 0. The action rule 0 defines actions according to the detected states of the buffer portion 0. For example, assuming the detected L2~L7 contents 0 represents a UDP packet, the associated buffer portion 0 may use the first storage zone 401 and the third storage zone 403. The action rule 0 executes a procedure of storing the UDP packet into the first storage zone 401 if the first storage zone is not full, and executes a procedure of storing the UDP packet into the third storage zone 403 if the first storage zone 401 has been full. Once both of the storage zones 401 and 403 have been full, the UDP packet will be discarded. Likewise, assuming the detected L2~L7 contents 1 represents a TCP packet, the associated buffer portion 1 may use the second storage zone 402 and the third storage zone 403. The action rule 1 executes a procedure of storing the TCP packet into the second storage zone 402 if the second storage zone is not full, and executes a procedure of storing the TCP packet into the third storage zone 403 if the second storage zone has been full. Once both of the storage zones 402 and 403 have been full, the TCP packet will be discarded and retransmitted later. The action rule 0 and the action rule 1 as described above are summarized in FIG. 4.

After the input data packet is successfully stored in the buffer 40, it can be transmitted to the destination station, e.g. the second station 4002, through the switch device 42 by checking the destination address of the data packet stored in the buffer and referring to the address correlation table 412.

Since different types of data packets are stored in respective storage zones, the lack of space for one type of data packet will not affect the storing of another type of data packet. This is particularly advantageous for reserving the storage space of the non-retransmissible data packets, e.g. UDP packets, from being occupied by the repetitively retransmitted data packets, e.g. TCP packets.

Figure 5:
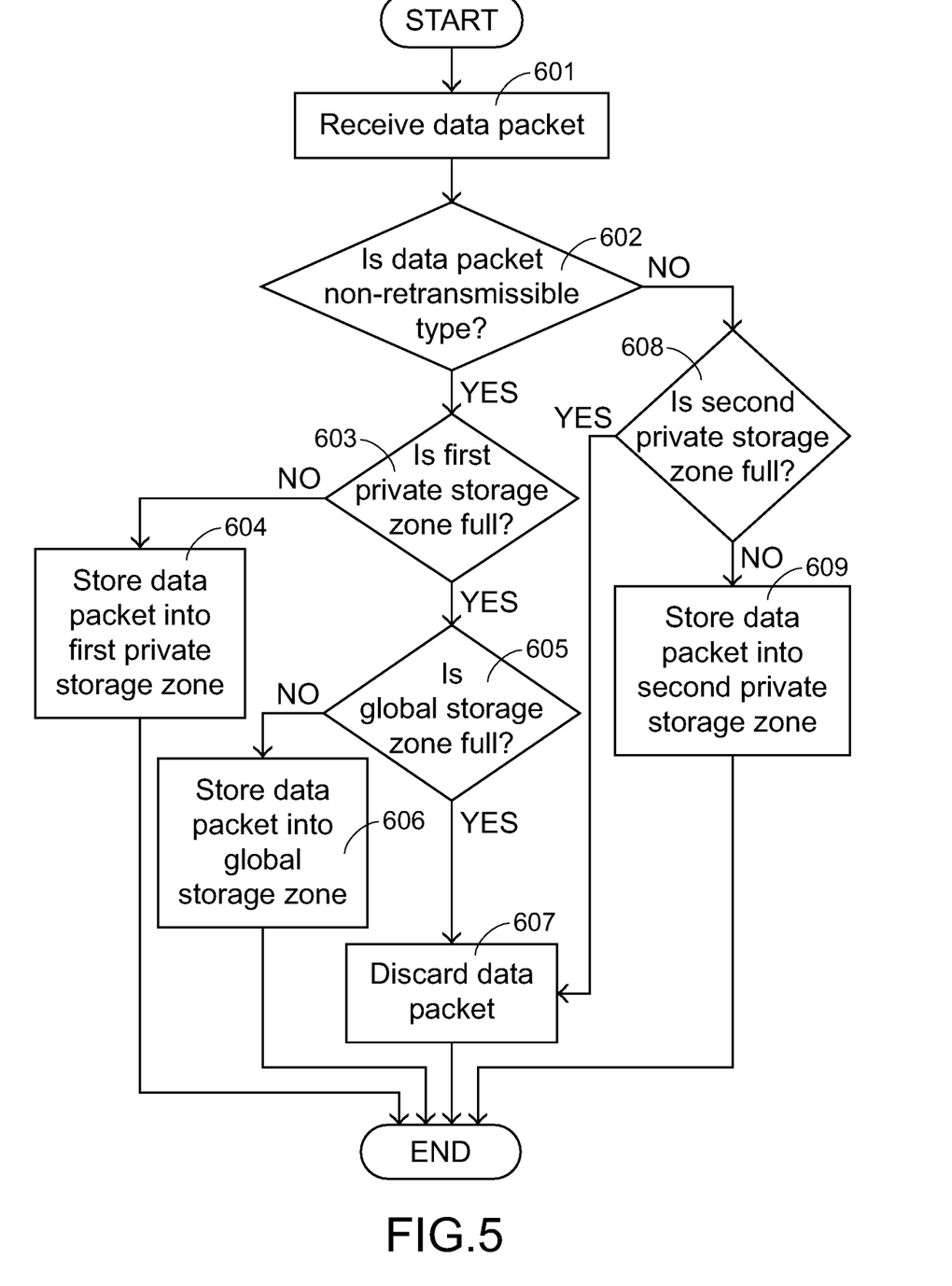
FIG. 5 is a flowchart illustrating the data-packet processing method according to a second embodiment of the present invention.

In another embodiment of the present invention, a data-processing method is designed to reserve the global storage space for exclusive or prior use of the non-retransmissible data packets in some specific situations. FIG. 5 illustrates the exclusive use of the third storage zone 403 by the non-retransmissible data packets, and FIG. 6 illustrates the prior use of the third storage zone 403 by the non-retransmissible data packets.

Please refer to FIG. 5. After a data packet is received (Step 601), whether the data packet is a non-retransmissible type of data packet is determined (Step 602). Meanwhile, whether a first private storage zone assigned for the non-retransmissible type of data packet is full or not is determined (Step 603). If the first private storage zone is not full, store the non-retransmissible type of data packet into the first private storage zone (Step 604). If the first private storage zone has been full, check whether a global storage zone is full or not (Step 605). If the global storage zone is not full, store the non-retransmissible type of data packet into the global storage zone (Step 606). Otherwise, discard the data packet (Step 607). On the other hand, if the input data packet is a retransmissible type of data packet, whether a second private storage zone assigned for the retransmissible type of data packet is full or not is determined (Step 608). If the second private storage zone is not full, store the retransmissible type of data packet into the second private storage zone (Step 609). Otherwise, directly discard the data packet (Step 607) and retransmit it later.

Figure 6:
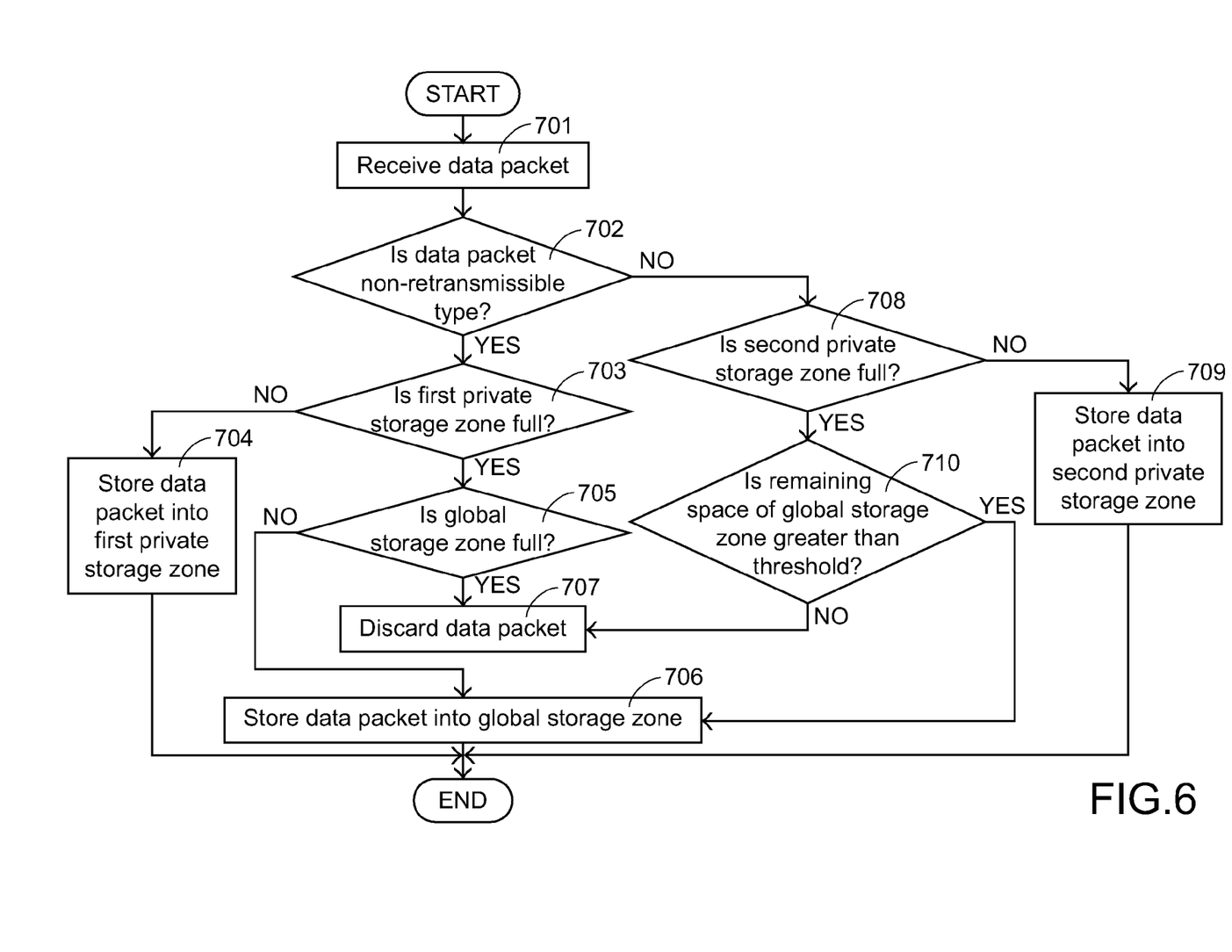
FIG. 6 is a flowchart illustrating the data-packet processing method according to a third embodiment of the present invention.

Alternatively, as illustrated in FIG. 6, after a data packet is received (Step 701), whether the data packet is a non-retransmissible type of data packet is determined (Step 702). Meanwhile, whether a first private storage zone assigned for the non-retransmissible type of data packet is full or not is determined (Step 703). If the first private storage zone is not full, store the non-retransmissible type of data packet into the first private storage zone (Step 704). If the first private storage zone has been full, check whether a global storage zone is full or not (Step 705). If the global storage zone is not full, store the non-retransmissible type of data packet into the global storage zone (Step 706). Otherwise, discard the data packet (Step 707). On the other hand, if the input data packet is a retransmissible type of data packet, whether a second private storage zone assigned for the retransmissible type of data packet is full or not is determined (Step 708). If the second private storage zone is not full, store the retransmissible type of data packet into the second private storage zone (Step 709). If the second private storage zone has been full, check whether the remaining space of a global storage zone is greater than a threshold or not (Step 710). If the global storage zone is greater than the threshold, e.g. 50%, it means that the global storage zone still has a certain amount of space, so it is fine to store the retransmissible type of data packet into the global storage zone (Step 706). If the global storage zone is no greater than the threshold, e.g. 50%, however, it is preferred to reserve the limited remaining space of the global storage zone for non-retransmissible data packets because the non-retransmissible data packets will be lost forever if not successfully transmitted. For this purpose, the retransmissible type of data packet is discarded (Step 707) and retransmitted later.

It is understood to those skilled in the art that the threshold is settable depending on practical requirements. Moreover, more than one kind of non-retransmissible data packets may need sharing the global storage zone. A plurality of thresholds can be set for different types of data packets according to the priority of packet types that the global storage zone is to be reserved for.

Figure 7:
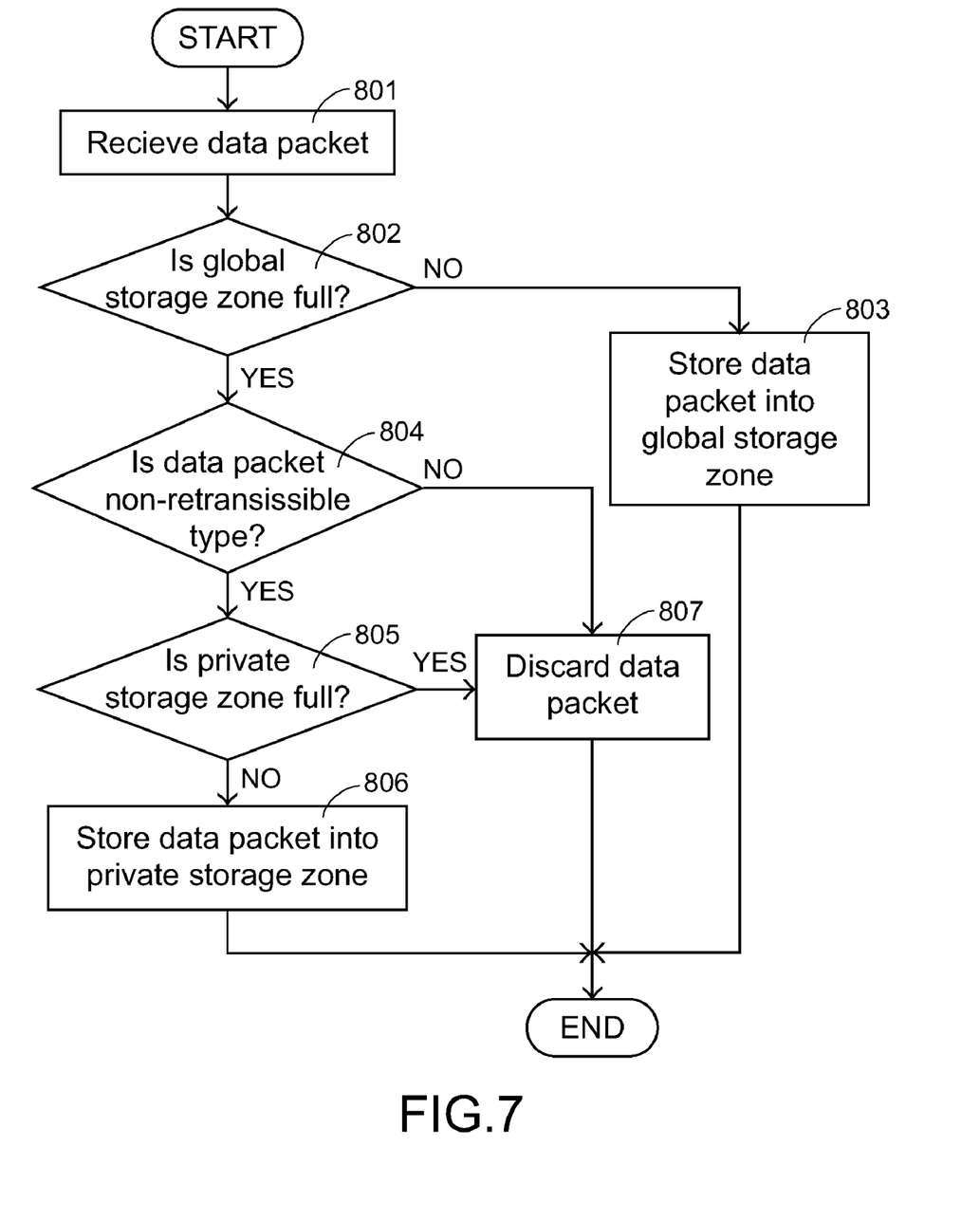
FIG. 7 is a flowchart illustrating the data-packet processing method according to a fourth embodiment of the present invention.

In another embodiment of the present invention, another data-processing method is designed to reserve the storage space of the buffer for more prior use of the non-retransmissible data packets. The buffer only includes a private storage zone for the non-retransmissible type of data packet and a global storage zone for both types of data packet. As illustrated in FIG. 7 after a data packet is received (Step 801), whether the global storage zone assigned to both types of data packet is full or not is first determined (Step 802). If the global storage zone is not full, store the data packet into the global storage zone (Step 803). If the global storage zone has been full, whether the data packet is a non-retransmissible type of data packet is determined (Step 804). If the data packet is not non-retransmissible, then discard the data packet (Step 807) and retransmit it later. If the data packet is a non-retransmissible type of data packet, whether the private storage zone is full or not is determined (Step 805). If the private storage zone is not full, then store the data packet into the private storage zone (Step 806). If the private storage zone has been full, then discard the data packet (Step 807).

That is to say, in this embodiment, there is no dedicated private storage zone for the retransmissible data packet. Once the remaining space of the buffer is no greater than a threshold, that means the global storage zone is full, then the retransmissible data packet is prohibited form storing into the buffer. Thus the priority of the non-retransmissible data packet to use the buffer will be enhanced.

To sum up, the present switch hub properly divides a buffer into a plurality of storage zones for storing different types of data packets which may need processing differentially. Furthermore, by providing a common storage zone and reserve more space of the common storage zone for the non-transmissible type(s) of data packets, data packets can be optimally processed.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data-packet processing method for transferring a data packet in a network system, comprising steps of:
   determining a type of the data packet to be transferred;
   defining a buffer with a plurality of private storage zones and a global storage zone, wherein each of the plurality of private storage zones corresponds to one type of data packet, and the global storage zone is common to a plurality of types of data packets;
   determining that the buffer is in a packet-accepting storage state when one of the plurality of private storage zones, which corresponds to the type of the data packet to be transferred, is not full or when the one of the plurality of private storage zones is full but the global storage zone is not so full as to a specified extent; and
   storing the data packet to be transferred into the buffer if the buffer is in the packet-accepting storage state;
   wherein the specified extent varies with the type of the data packet to be transferred;
   wherein the type of the data packet is determined according to contents of Level 2 to Level 7 (L2-L7 contents) recorded in the data packet; and
   wherein the step of storing the data packet to be transferred into the buffer comprises steps of:
      storing the data packet in one of the plurality of private storage zones corresponding to the type of the data packet when the corresponding private storage zone is not full; and
      storing the data packet in the global storage zone when the corresponding private storage zone is full but the global storage zone is not so full as to the specified extent.

2. The data-packet processing method according to claim 1, wherein the specified extent is that a remaining space of the global storage zone is greater than a first threshold for a first type of data packet, and the specified extent is that a remaining space of the global storage zone is greater than a second threshold for a second type of data packet;
   wherein the first threshold is lower than the second threshold.

3. The data-packet processing method according to claim 2 wherein the first type of data packet is a non-retransmissible data packet, and the second type of data packet is a retransmissible data packet.

4. A network system for transferring a data packet from a first station, comprising:
   a buffer coupled to the first station and defined with at least one private storage zone and a global storage zone for receiving and temporarily storing the data packet to be transferred when the buffer is in a packet-accepting storage state, wherein the at least one private storage zone corresponds to a specific type of data packet, and the global storage zone is common to a plurality of types of data packets;
   a controller coupled to the first station and the buffer for determining a type of the data packet to be transferred, determining whether the buffer is in the packet-accepting storage state, and prohibiting the data packet to be transferred from being stored into the buffer when the buffer is not in the packet-accepting storage state, wherein the buffer is determined to be in the packet-accepting storage state when the at least one private storage zone corresponding to the type of the data packet to be transferred is not full, or when the at least one private storage zone corresponding to the type of the data packet to be transferred is full but a remaining space of the global storage zone is greater than a threshold specific to the data packet to be transferred;

a switching device coupled to the buffer, the controller and a plurality of stations for transferring the data packet stored in the buffer to one of the station;

a data-packet classifying table referred by the controller to determine an action of the controller according to L2-L7 contents of the data packet to be transferred and whether the buffer is in the packet-accepting storage state; and wherein if the at least one private storage zone corresponding to the type of the data packet to be transferred is not full, the action of the controller is to store the data packet in the at least one private storage zone; if the at least one private storage zone corresponding to the type of the data packet to be transferred is full and the remaining space of the global storage zone is greater than the threshold, the action of the controller is to store the data packet in the global storage zone; otherwise, the action of the controller is to prohibit the data packet from being stored into the buffer.

5. The network system according to claim 4 wherein different thresholds are set for different types of data packets.

6. The network system according to claim 5 wherein a user datagram protocol (UDP) packet has a threshold lower than that of a transmission control protocol (TCP) packet.

7. The network system according to claim 4 further comprising an address correlation table referred by the controller to determine a destination station among the plurality of stations, where the data packet is to be transferred.

8. The network system according to claim 4 wherein the buffer, the controller and the switching device are incorporated in a switch hub.

9. A network system for transferring a data packet from a first station, comprising:

a buffer coupled to the first station and defined with at least one private storage zone and a global storage zone for receiving and temporarily storing the data packet to be transferred when the buffer is in a packet-accepting storage state, wherein the at least one private storage zone corresponds to a specific type of data packet, and the global storage zone is common to a plurality of types of data packets;

a controller coupled to the first station and the buffer for determining a type of the data packet to be transferred, determining whether the buffer is in the packet-accepting storage state, and prohibiting the data packet to be transferred from being stored into the buffer when the buffer is not in the packet-accepting storage state, wherein the buffer is determined in the packet-accepting storage state when the global storage zone is not full, or when the global storage zone is full but the at least one private storage zone corresponding to the type of the data packet to be transferred is not full;

a switching device coupled to the buffer, the controller and a plurality of stations for transferring the data packet stored in the buffer to one of the stations;

a data-packet classifying table referred by the controller to determine an action of the controller according to L2-L7 contents of the data packet to be transferred and whether the buffer is in the packet-accepting storage state; and wherein if the global storage zone is not full, the controller stores the data packet in the global storage zone; if the global storage zone is full and the at least one private storage zone corresponding to the type of the data packet to be transferred is not full, the controller stores the data packet in the at least one private storage zone; otherwise, the controller prohibits the data packet from being stored into the buffer.

10. The network system according to claim 9 wherein when the type of the data packet to be transferred is non-retransmissible type, the controller stores the data packet to be transferred in the at least one private storage zone.

* * * * *